US007839758B1

(12) United States Patent
Gregorian et al.

(10) Patent No.: US 7,839,758 B1
(45) Date of Patent: Nov. 23, 2010

(54) ANALOG ECHO CANCELLER WITH INTERPOLATING OUTPUT

(75) Inventors: Roubik Gregorian, Saratoga, CA (US); Gaurav Malhotra, Santa Clara, CA (US)

(73) Assignee: Net Logic Microsystems, Inc., Santa Clara, CA (US)

( * ) Notice: Subject to any disclaimer, the term of this patent is extended or adjusted under 35 U.S.C. 154(b) by 114 days.

(21) Appl. No.: 12/236,408

(22) Filed: Sep. 23, 2008

(51) Int. Cl.
*H04J 1/12* (2006.01)
(52) U.S. Cl. .................................. 370/201; 370/235
(58) Field of Classification Search ......... 370/200–253, 370/289–292, 503; 375/227, 254
See application file for complete search history.

(56) References Cited

U.S. PATENT DOCUMENTS 5,148,488 A * 9/1992 Chen et al. ................ 704/219
5,777,913 A * 7/1998 Rasmusson ............... 708/322
2006/0133303 A1* 6/2006 Shida ......................... 370/286

* cited by examiner

*Primary Examiner*—Ricky Ngo
*Assistant Examiner*—Iqbal Zaidi
(74) *Attorney, Agent, or Firm*—Stattler-Suh PC (57) ABSTRACT

A method and system are described for canceling an echo signal with an echo canceller in the analog domain. In one embodiment, a system includes an echo canceller that includes an interpolation filter unit, operating in a digital domain, that receives a first digital echo estimate signal from a LMS unit and generates a second digital echo estimate signal without oversampling. A digital-to-analog converter (DAC) receives the second digital echo estimate signal and generates an analog echo estimate signal without oversampling. The echo canceller prevents the DAC from adding a high frequency component to the analog echo estimate signal. A subtractor adds the analog echo estimate signal to an incoming signal having an echo signal. The subtractor generates an analog signal with reduced echo signal in the useful frequency band of the incoming signal.

15 Claims, 7 Drawing Sheets

ANALOG ECHO CANCELLER WITH INTERPOLATING OUTPUT

TECHNICAL FIELD

Embodiments of the invention relate to the field of canceling echo signals; more specifically, embodiments of the invention relate to using an interpolation filter operating in the digital domain as part of generating an echo estimate.

BACKGROUND

Figure 1:
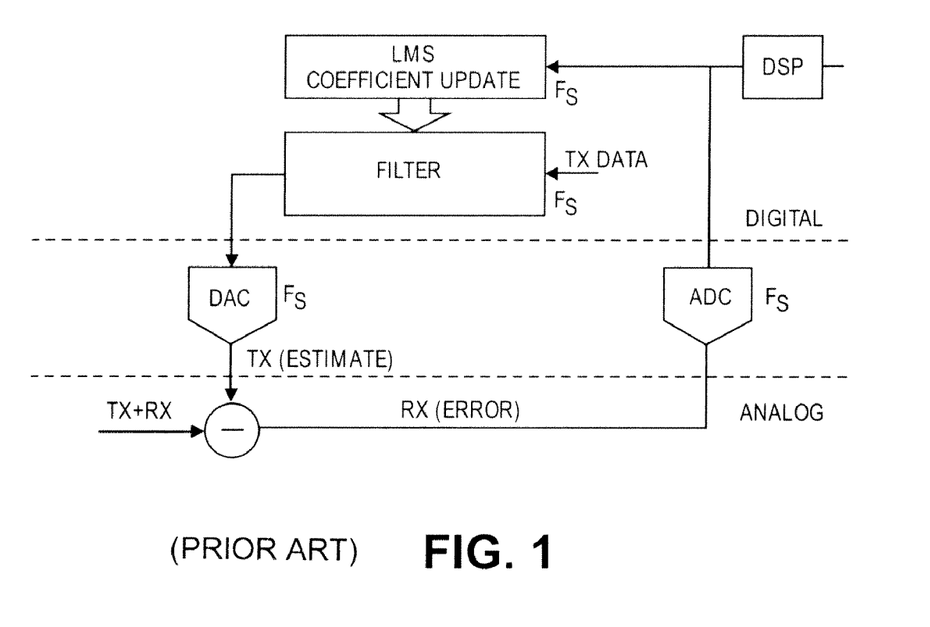
FIG. 1 illustrates a conventional circuit for canceling an echo signal.

Digital signal processing is widely used to process data carrying signals to remove, for example, inter-symbol interference (ISI), echoes, cross talk and other impairments, and to provide filtering, correlation and other processing. Echo cancellation involves first recognizing the originally transmitted signal that re-appears, with some delay, in the transmitted or received signal. Once the echo is recognized, it can be removed by 'subtracting' it from the transmitted or received signal. This technique is generally implemented using a digital signal processor (DSP), but can also be implemented in software. Echo cancellation is done using either echo suppressors or echo cancellers, or in some cases both. In a full duplex data communication system having a single pair of wires, transmit and receive signals share the same channel bandwidth and their spectrums overlap. The signal that is applied to the receiver contains an attenuated and impaired version of the transmitted signal from the remote end plus a portion of the local transmit signal. In such a system an echo canceller is needed before the receiver can process the receive signal to recover the data. One implementation of a conventional echo canceller (EC) is shown in FIG. 1. The echo canceller accepts as input a composite signal (TX+RX) which is comprised of the "wanted" receive and "unwanted" local transmitted signals. The purpose of the echo canceller is to filter out the unwanted local transmitted component and deliver to the system the receive component for further processing. It accomplishes this task by first recognizing and then estimating a replica of the transmitted signal and subsequently subtracting it from the composite signal hence recovering the receive component.

In a DSP based system, the transmitter and echo canceller both operate at sample rate $F_s$ where the sampling period $T_s$ is $1/F_s$. The echo canceller is an adaptive transversal filter that accepts as input, samples of the local transmit signal. Each sample period $T_s$, the echo canceller computes one echo sample and delivers it to a digital-to-analog converter (DAC) which in turn converts it to an analog signal and subtracts it from the composite signal. The signal at the output of the subtractor is the receive signal which also serves as the error signal for the echo canceller. The analog receive signal (error signal) is fed into an analog-to-digital converter (ADC) which is sampled at the same rate $F_s$ and converted to a digital format. The digital signal is fed into the DSP block for further processing of the receive signal. The same signal serves as an error signal and is also fed into the coefficient update block of the echo canceller. This block updates the coefficients of the adaptive filter using a least mean square (LMS) algorithm in such a way that it minimizes the correlation (resemblance) between the receive (error) and transmitted signals. The combination of the transversal filter and the LMS coefficient update blocks form the echo canceller.

In an echo canceller such as the one shown in FIG. 1 that operates at a sample rate of $F_s$ the spectral (frequency) components of the echo can only be cancelled in a range limited to $F_s/2$. Beyond this range the echo canceller is not effective. In addition to the echo canceller not being effective beyond $F_s/2$, in the process converting the digital input to analog waveform via the DAC it ends up adding some unwanted components beyond $F_s/2$. Thus, from 0 to $F_s/2$ the echo canceller cancels echo and beyond $F_s/2$ the echo canceller aggravates the echo. This addition of unwanted components results in increased distortion and jitter due to extra high frequency components added by the DAC beyond $F_s/2$.

SUMMARY OF THE INVENTION

A method and system are described for canceling an echo signal with an echo canceller in the analog domain. In one embodiment, a system includes an echo canceller to generate a first digital echo estimate signal based upon an incoming signal having an echo signal. The echo canceller also includes an interpolation filter unit, operating in a digital domain, that generates a second digital echo estimate signal without oversampling based on the first digital echo estimate signal. A DAC receives the second digital echo estimate signal and generates an analog echo estimate signal without oversampling. The interpolating filter prevents the DAC from adding a high frequency component to the analog echo estimate signal.

A subtractor subtracts the analog echo estimate signal from the incoming signal having the echo signal. The subtractor generates an analog signal with reduced echo signal in the useful frequency band or bandwidth of the incoming signal and no significant additional high frequency component is added outside of the useful frequency band or bandwidth of the incoming signal. An ADC is coupled to the subtractor and receives the analog signal from the subtractor. The ADC generates a digital signal sent to a DSP unit.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and system are described for canceling an echo signal with an echo canceller in the analog domain. In one embodiment, a system includes an echo canceller that includes a least mean square (LMS) unit to receive a digital error signal based upon an incoming signal having an echo signal. The LMS unit provides coefficient updates to an adaptive tranversal filter, which also receives samples of a local transmit signal. The LMS unit using a LMS algorithm minimizes the correlation between the digital error signal and the local transmit signal. The adaptive transveral filter generates a first digital echo estimate signal based upon the local transmit signal and the digital error signal. The echo canceller also includes an interpolation filter unit that receives the first digital echo estimate signal and generates a second digital echo estimate signal without oversampling. A DAC receives the second digital echo estimate signal and generates an analog echo estimate signal without oversampling. The interpolating filter reduces substantially a high frequency component from being added by the DAC to the analog echo estimate signal.

A subtractor subtracts the analog echo estimate signal from the incoming signal having the echo signal. The subtractor generates an analog signal with substantially no echo signal in the useful frequency band or bandwidth of the incoming signal and no additional high frequency component is added outside of the useful frequency band or bandwidth of the incoming signal. An ADC is coupled to the subtractor and receives the analog signal from the subtractor. The ADC generates a digital signal sent to a DSP unit.

In the following description, numerous specific details are set forth, such as specific frequencies, in order to provide a thorough understanding of the present invention. It will be apparent to one skilled in the art, that the present invention may be practiced without these specific details. In other instances, well-known circuit elements, such as amplifiers and multipliers, are not described in detail in order to not unnecessarily obscure the present embodiments.

Figure 2:
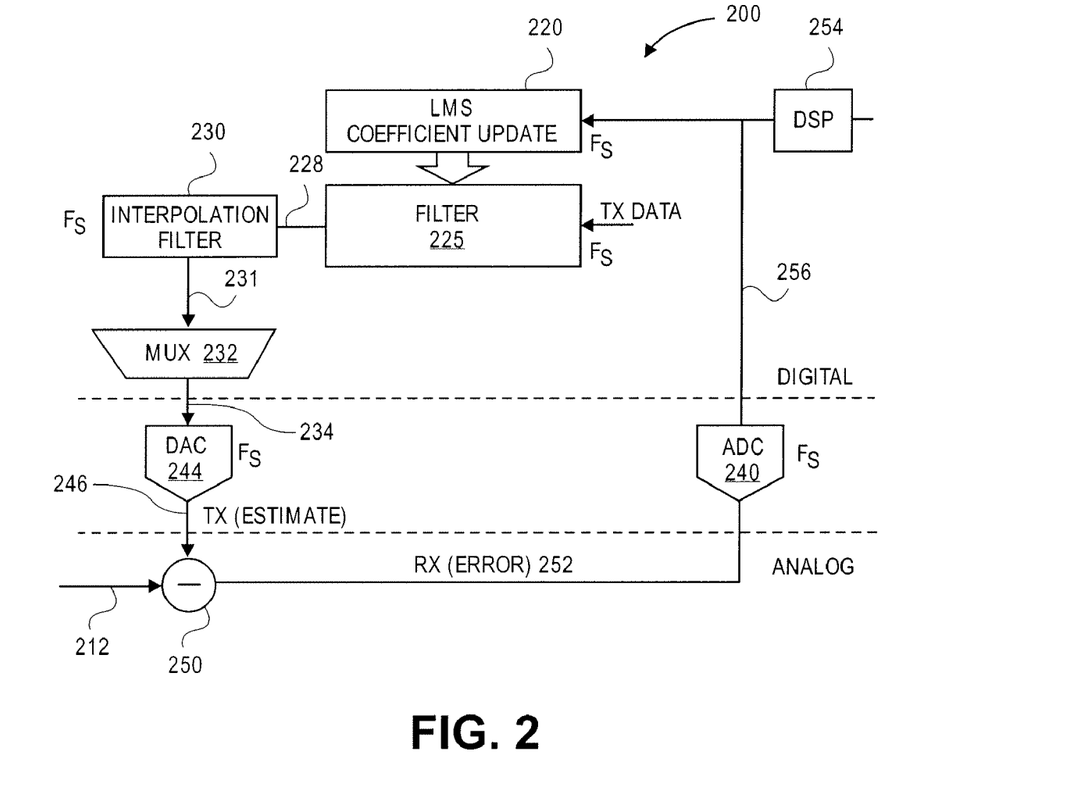
FIG. 2 illustrates a circuit for canceling an echo signal in an analog domain in accordance with one embodiment.

FIG. 2 illustrates a circuit for canceling an echo signal in an analog domain in accordance with one embodiment. The circuit 200 includes a LMS unit 220, an adaptive filter 225, an interpolation filter 230, a multiplexer 232, a DAC 244, a subtractor 250, an ADC 240, and a DSP unit 250. An incoming signal 212 (RX+TX) includes "wanted" receive and "unwanted" local transmitted signals. The subtractor 250 subtracts the unwanted transmit signals and generates the receive signals 252 which are also used as error signals. In some embodiments, the subtractor 250 is replaced with a summer or arithmetic logic unit or other unit providing similar functionality.

The ADC 240 receives the receive (error) signals 252 and generates digital receive (error) signals 256 that are sent to a digital signal processing (DSP) unit 254 and also feed into the LMS unit 220. The LMS unit provides coefficient updates to the adaptive tranversal filter 225, which also receives samples of local transmit signals (TX data). The LMS unit 220 using a LMS algorithm minimizes the correlation between the digital error signals 256 and the local transmit signals (TX data). The adaptive transveral filter 225 generates digital echo estimate signals 228 based upon the local transmit signals and the digital error signals. Operating in the digital domain, the interpolation filter 230 applies interpolation to the digital echo estimate signals 228 to generate additional data points and corresponding digital echo estimate signals 231. The interpolation filter 230 acts as a low pass filter in generating the digital echo estimate signals 231. In one embodiment, the digital echo estimate signals 231 are combined into a digital echo estimate signal 234 using the multiplexer 232, which sends the signal 234 to the DAC 244. In another embodiment, a single digital echo signal 231 is directly sent to the DAC 244 with no multiplexer 232 being used. The echo DAC 244 converts the digital estimate echo signal 234 into an analog estimate echo signal 246. The signal 246 is subtracted from the signal 212 to generate the receive signals 252 having a reduced echo signal across a certain frequency range (e.g., 0 to 400 MHz). The signals 252 are sent to ADC 240 which converts these signals into the digital domain before being sent to the DSP unit 254 for further processing.

The addition of high frequency components by the DAC 244 can be avoided by using the interpolation filter 230 in conjunction with the DAC running at 2Fs. The interpolation filter 230 is a digital filter that suppresses the echo estimate beyond Fs BEFORE it is received by the DAC 244.

For the example described above, the DAC 244 and interpolation filter 230 may each have a clock frequency of 1.6 GHz and the ADC 240 may have a clock frequency of 800 MHz. In another embodiment, the interpolation filter 230 includes two or more filters each having a clocking frequency of 800 MHz. In contrast to prior approaches, the echo signal is reduced between 0 and 400 MHz without having the DAC 244 add a high frequency component to the digital estimate echo signal 246.

Figure 5A:
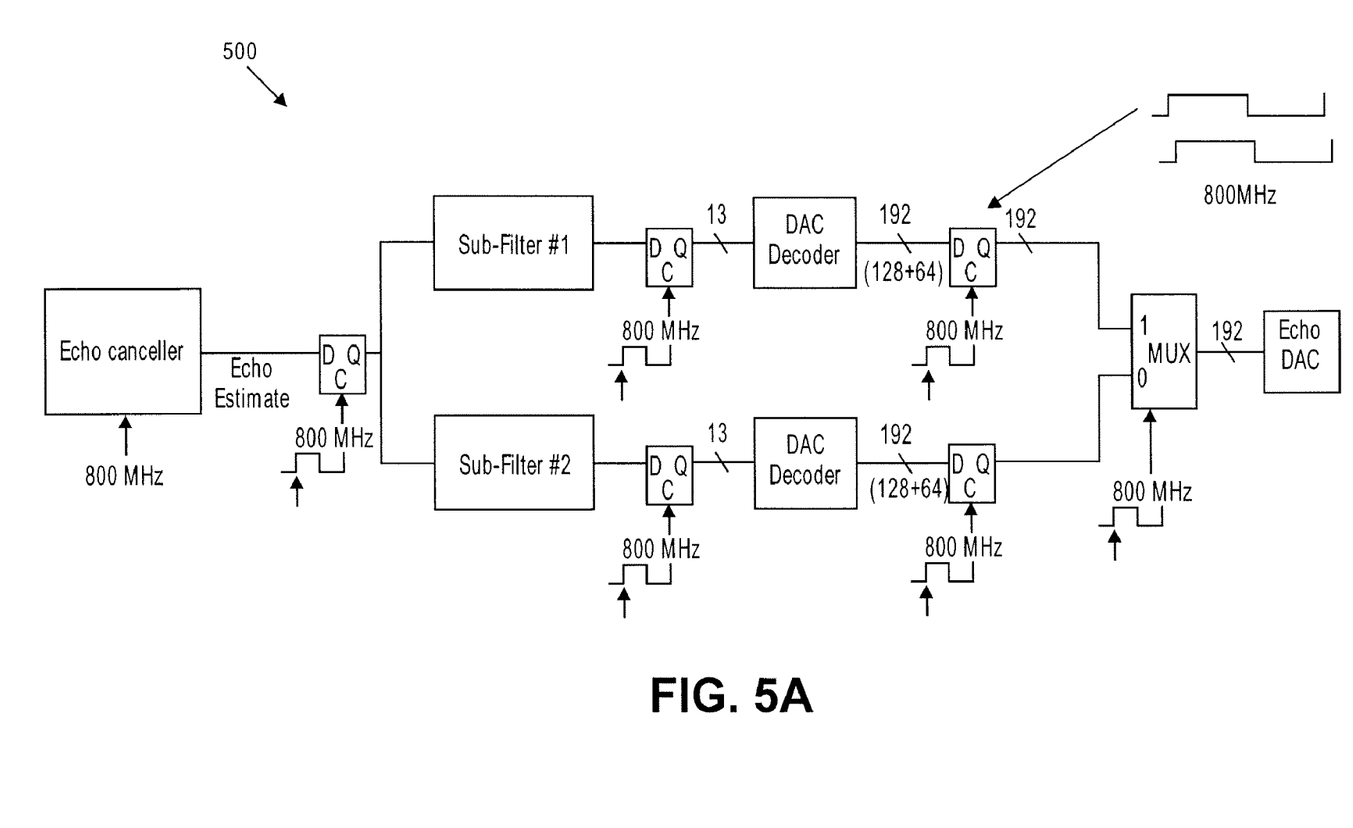
FIG. 5A illustrates a circuit for canceling an echo signal with an interpolating unit having two sub-filters in accordance with one embodiment.

In one embodiment, the interpolation filter is a low pass filter that is implemented using well known poly phase configuration as illustrated in FIG. 5A. Poly phase configuration enables running the digital interpolation filter 500 at Fs, with the ability to shape the spectrum up to 2Fs. This way, the echo is cancelled up to Fs without increasing the residual echo levels beyond Fs.

Figure 5B:
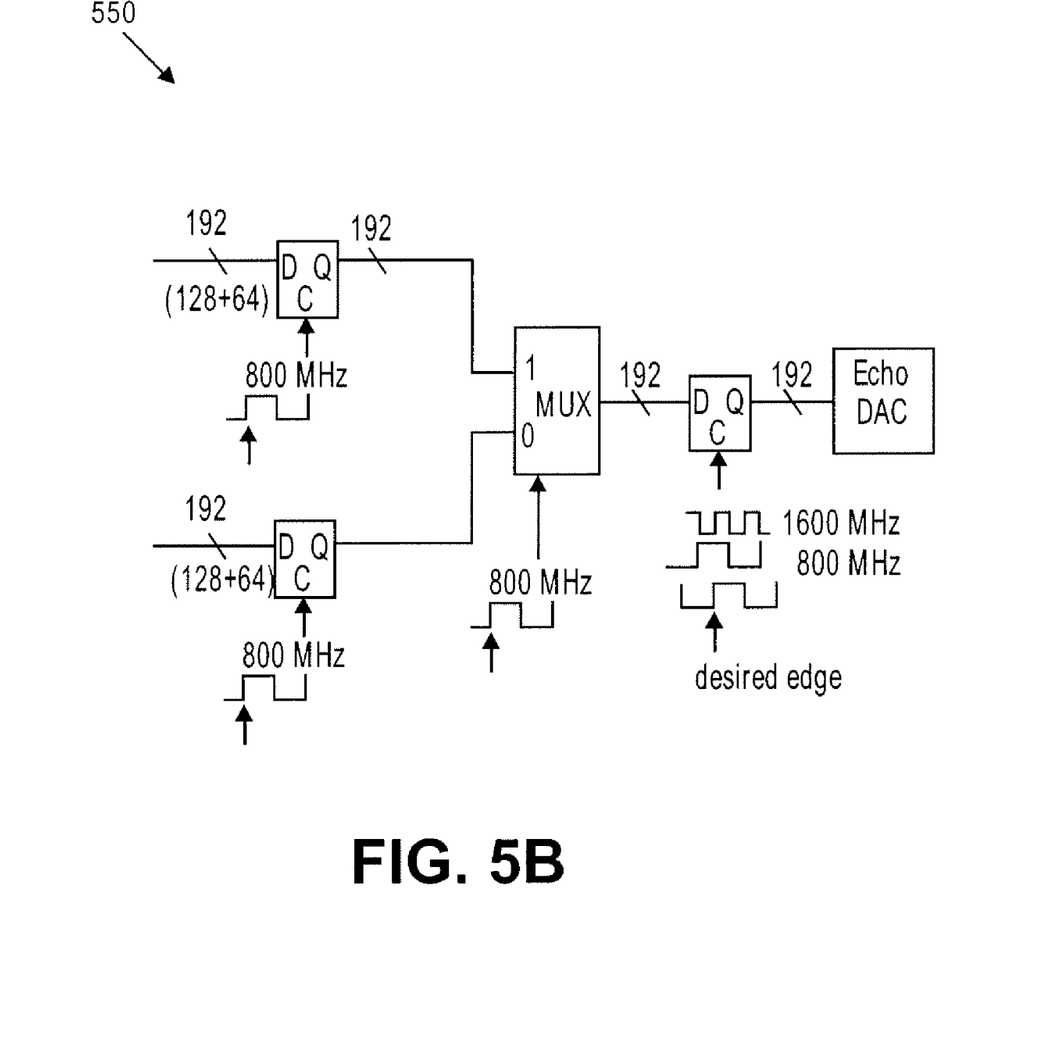
FIG. 5B illustrates a circuit for canceling an echo signal with an interpolating unit having two sub-filters in accordance with another embodiment.

For the DAC 244 to run at 2Fs, a two phase implementation (2 filters processing in parallel) of interpolation filters is used. For example, in FIG. 5A the sub-filter #1 and sub-filter #2 form two filters operating in parallel. This concept can be extended to the general case where the echo DAC runs N*Fs, by using N phase (N filters processing in parallel) interpolation filters, all phases of which are running at Fs. FIG. 5B illustrates another implementation of the interpolating filter 500 illustrated in FIG. 5A in accordance with another embodiment. The interpolating output 550 in FIG. 5B includes an additional D latch or flip-flop coupled between the multiplexer and the echo DAC in comparison to the interpolating filter 500 illustrated in FIG. 5A.

Figure 6:
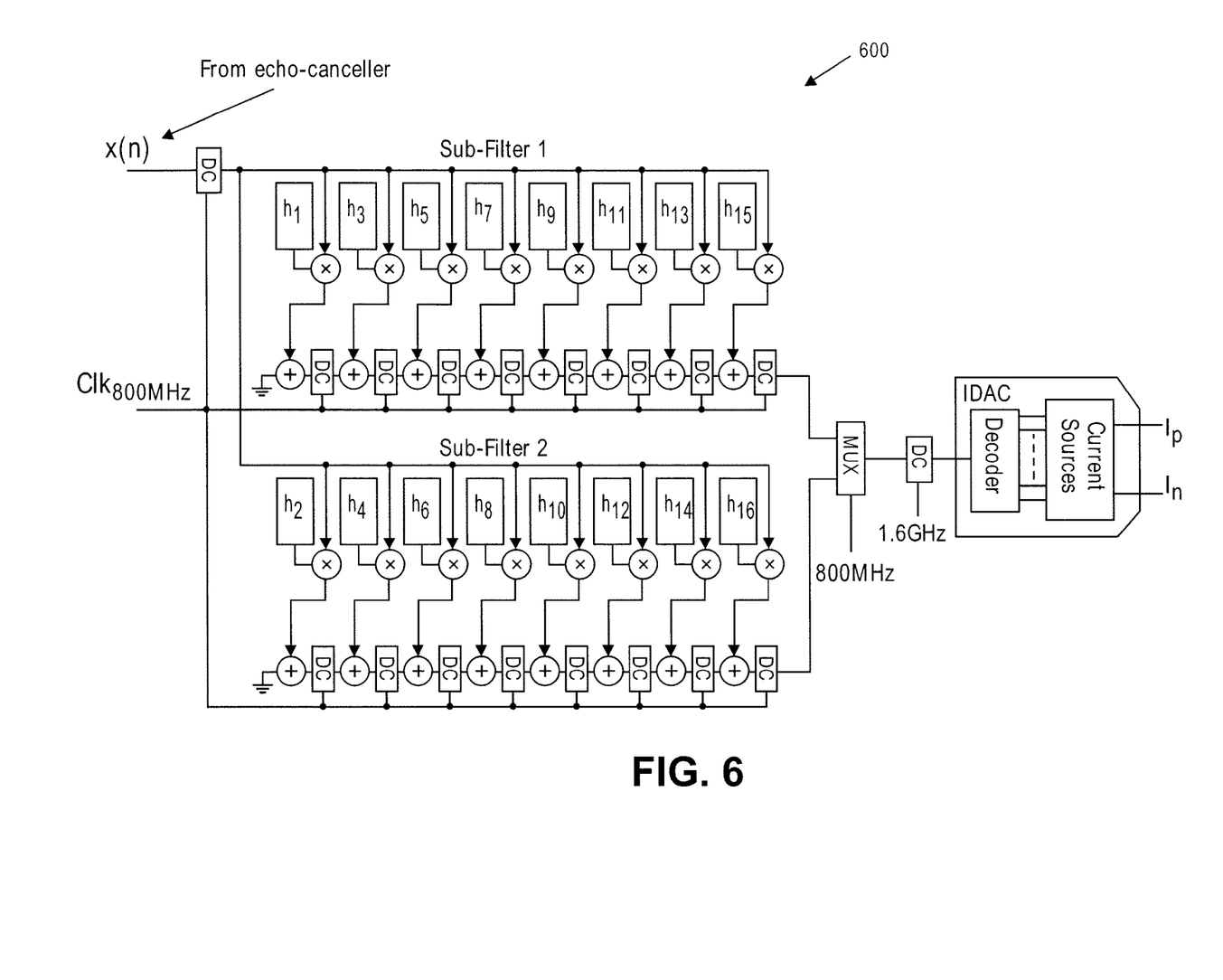
FIG. 6 illustrates an interpolating unit having two sub-filters in accordance with one embodiment.

FIG. 6 illustrates an interpolating unit having two sub-filters in accordance with one embodiment. The interpolation filter 600 applies interpolation to signal x(n) to generate additional data points for the output echo estimate signals. Each sub-filter operates at a clocking frequency of 800 MHz and cancels a portion of the echo signal across a certain frequency range. The output echo estimate signals are multiplexed and sent to the DAC operating at 1.6 GHz.

Figure 3:
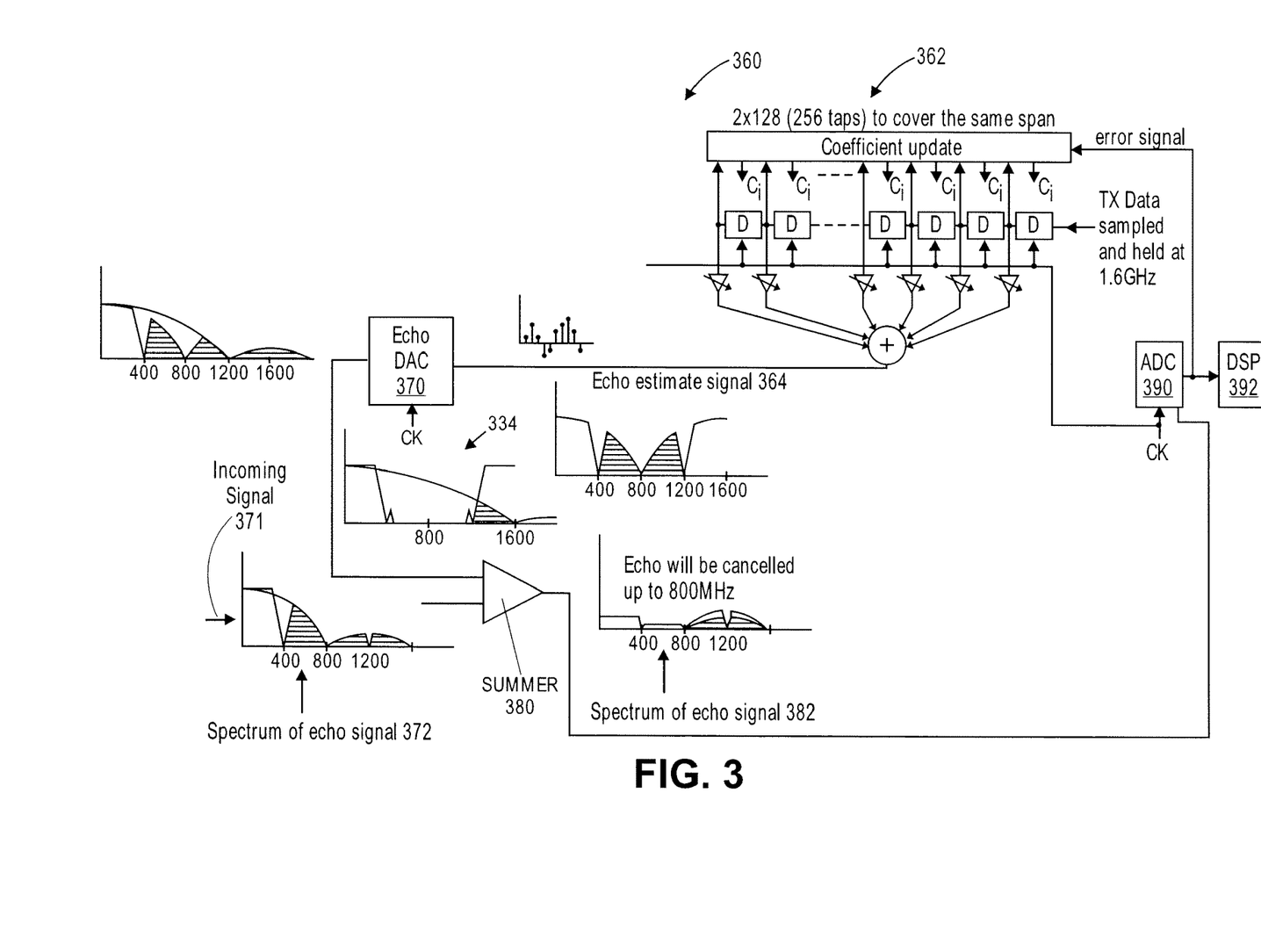
FIG. 3 illustrates a circuit for canceling an echo signal in an analog domain in accordance with another embodiment.

FIG. 3 illustrates a circuit 360 for canceling an echo signal in an analog domain in accordance with one embodiment. The circuit 360 includes a LMS 362, a DAC 370, a summer 380, an ADC converter 390, and a DSP 392. The circuit 360 includes similar components to the circuit 200, but the circuit 360 has no interpolating filter. The circuit 360 generates a signal 382 having a reduced echo between 0 and 800 MHz.

Figure 4:
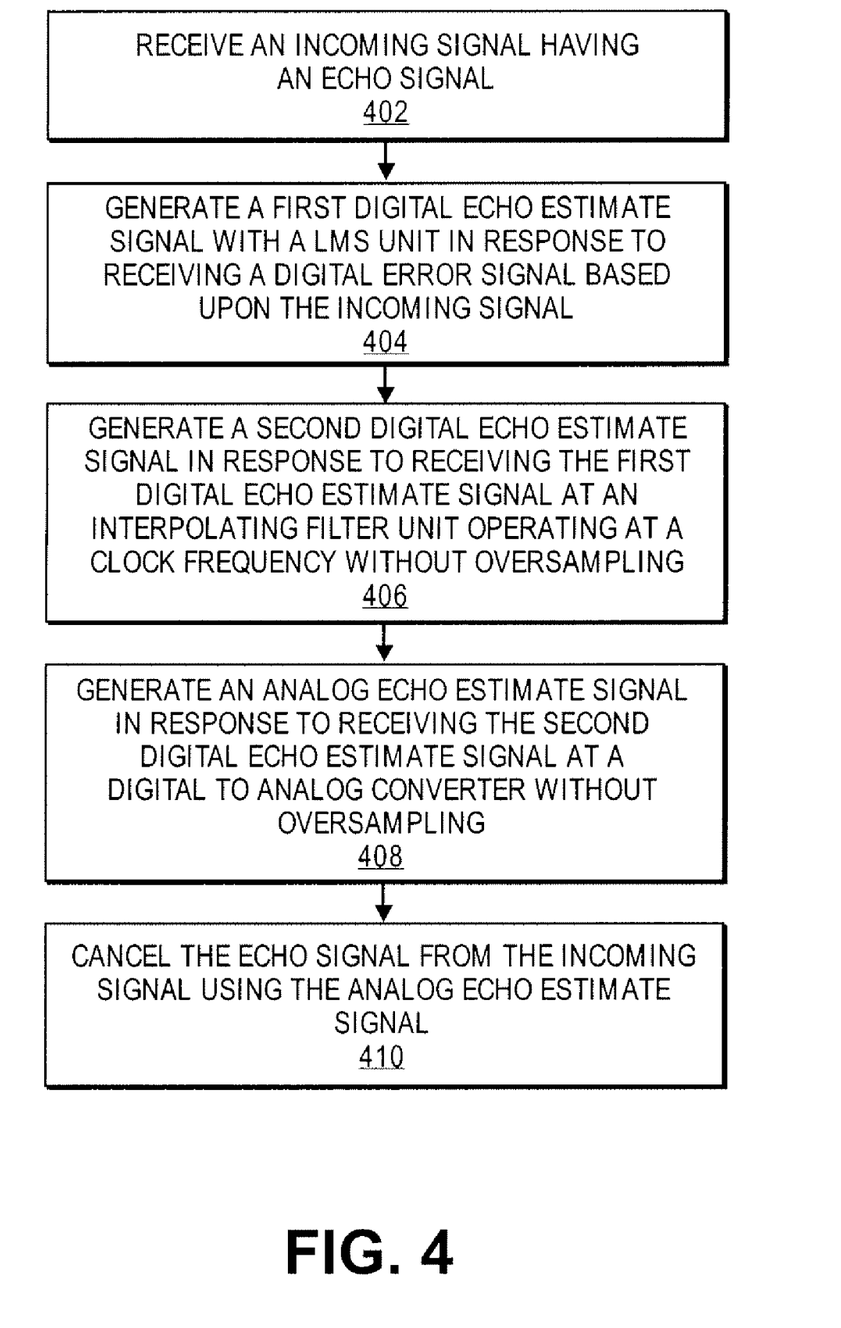
FIG. 4 illustrates a flowchart which represents a process for canceling an echo signal in accordance with one embodiment.

FIG. 4 illustrates a flowchart which represents a process for canceling an echo signal in accordance with one embodiment. The process includes receiving an incoming signal having an echo signal at processing block 402. Next, the process includes generating a first digital echo estimate signal with a LMS unit in response to receiving a digital error signal based upon the incoming signal at processing block 404. Next, the process includes generating a second digital echo estimate signal in response to receiving the first digital echo estimate signal at an interpolation filter unit operating at a clocking frequency without oversampling at processing block 406. Next, the process includes generating an analog echo estimate signal in response to receiving the second digital echo estimate signal at an digital to analog (D/A) converter without oversampling at processing block 408. Finally, the process includes canceling the echo signal from the incoming signal using the analog echo estimate signal at processing block 410.

Thus, improved analog front end processing has been described for a data carrying signal received over a twisted pair or pairs. The echo canceller prevents the DAC from adding a high frequency component to the incoming signal. Advantageously, the main ADC receives input signals with less jitter reducing the jitter sensitivity of the ADC.

Although present embodiments have been described with reference to specific embodiments, it will be evident that various modifications and changes may be made to these embodiments without departing from the broader spirit and scope of the present embodiments. Accordingly, the specification and drawings are to be regarded in an illustrative rather than a restrictive sense.

What is claimed is:

1. A system, comprising an echo canceller, having at least one portion operating in an analog domain and at least one portion operating in a digital domain, to generate a first digital echo estimate signal with a least mean square (LMS) unit in response to receiving a digital error signal based upon an incoming signal; the echo canceller comprises, an interpolation filter unit to receive the first digital echo estimate signal and to generate a second digital echo estimate signal having a suppressed echo estimate beyond a first clocking frequency, the interpolation filter unit to operate in the digital domain at the first clocking frequency without oversampling; and a digital-to-analog converter (DAC), coupled to the interpolation unit, to receive the second digital echo estimate signal with the suppressed echo estimate beyond the first clocking frequency and generate an analog echo estimate signal without oversampling in order to reduce an echo signal from the incoming signal using the analog echo estimate signal.

2. The system of claim 1, further comprising
   a subtractor, coupled to the DAC, to add the analog echo estimate signal to the incoming signal having echo signal, the subtractor to generate an analog signal with a reduced echo signal within a frequency band of the incoming signal.

3. The system of claim 2, further comprising an analog-to-digital converter (ADC), coupled to the subtractor, to receive the analog signal from the subtractor and to generate a digital signal, the ADC operates at a second clocking frequency without oversampling.

4. The system of claim 1, wherein the DAC operates at a third clocking frequency.

5. The system of claim 3, further comprising a digital signal processor (DSP), coupled to the ADC, to receive the digital signal from the ADC.

6. The system of claim 4, wherein the interpolation filter unit comprises at least two interpolation filters each operating at the first clocking frequency with no oversampling.

7. The system of claim 6, wherein the third clocking frequency is equal to at least two times the first clocking frequency of the interpolation filter unit.

8. The system of claim 7, wherein the echo canceller cancels the echo signal up to the first clocking frequency and substantially reduces the echo signal beyond the first clocking frequency to at least two times the first clocking frequency.

9. The system of claim 1, wherein the echo canceller substantially reduces high frequency components from being added to the incoming signal by the DAC, the high frequency component having a frequency greater than a frequency band of the incoming signal.

10. The system of claim 1, wherein the echo canceller further comprises an adaptive filter coupled to the LMS unit to receive coefficient updates from the LMS unit, the adaptive filter to generate the first digital echo estimate signal.

11. A method, comprising:
    generating a first digital echo estimate signal with an echo canceller operating in both analog and digital domains in response to receiving a digital error signal from a least mean square (LMS) unit; generating a second digital echo estimate signal having a suppressed echo estimate beyond a clocking frequency in response to receiving the first digital echo estimate signal at an interpolation filter unit that is operating in the digital domain at the clocking frequency without oversampling; generating an analog echo estimate signal in response to receiving the second digital echo estimate signal with the suppressed echo estimate beyond the clocking frequency at a digital to analog converter (DAC) that is operating without oversampling; and reducing an echo signal from the incoming signal using the analog echo estimate signal.

12. The method of claim 11, further comprising:
    receiving the incoming signal having the echo signal.

13. The method of claim 11, wherein the echo canceller prevents the DAC from adding a high frequency component to the incoming signal, the high frequency component having a frequency greater than a frequency band of the incoming signal.

14. An apparatus, comprising means for generating a first digital echo estimate signal in response to receiving a digital error signal from a least mean square (LMS) unit; means for generating a second digital echo estimate signal having a suppressed echo estimate beyond a clocking frequency in response to receiving the first digital echo estimate signal at an interpolation filter unit operating in the digital domain at the clocking frequency without oversampling; and means for generating an analog echo estimate signal in response to receiving the second digital echo estimate signal with the suppressed echo estimate beyond the clocking frequency at a digital to analog converter that is operating without oversampling; and
    means for reducing an echo signal from the incoming signal using the analog echo estimate signal.

15. The apparatus of claim 14, further comprising means for receiving an incoming signal having an echo signal.

\* \* \* \* \*